US005108688A

United States Patent [19]

Mazzoni

[11] Patent Number: 5,108,688

[45] Date of Patent: Apr. 28, 1992

[54] PROCESS OF AND APPARATUS FOR SHAPING PIECES OF SOFT, PASTY MATERIAL

[75] Inventor: Aldo Mazzoni, Busto Arsizio, Italy

[73] Assignee: Construzioni Meccaniche G. Mazzoni S.p.A., Busto Arsizio, Italy

[21] Appl. No.: 477,801

[22] PCT Filed: Jul. 21, 1988

[86] PCT No.: PCT/IT88/00057

§ 371 Date: Jan. 16, 1990

§ 102(e) Date: Jan. 16, 1990

[87] PCT Pub. No.: WO89/01024

PCT Pub. Date: Feb. 9, 1989

[30] Foreign Application Priority Data

Aug. 4, 1987 [IT] Italy ............................ 21585 A/87

[51] Int. Cl.[5] ..................... B29C 43/04; B29C 43/08; B29C 43/40

[52] U.S. Cl. ............................... 264/297.5; 264/161; 264/297.6; 264/297.7; 264/330; 425/233; 425/235; 425/237; 425/292; 425/294; 425/395; 425/408; 425/806

[58] Field of Search ..................... 264/40.1, 161, 297.1, 264/297.5, 297.6, 297.8, 297.9, 330; 425/135, 150, 233, 235, 236, 237, 292, 294, 395, 408, 437, 806

[56] References Cited

U.S. PATENT DOCUMENTS 3,365,764 1/1968 Wall .

FOREIGN PATENT DOCUMENTS 523501 4/1931 Fed. Rep. of Germany .
1903884 8/1970 Fed. Rep. of Germany .
58-160108 9/1983 Japan .

*Primary Examiner*—Leo B. Tentoni
*Attorney, Agent, or Firm*—Young & Thompson

[57] ABSTRACT

An apparatus for molding pieces of soap or other soft and pasty substances having at least a central rotor (2) capable of a reciprocating rotating motion supporting two half-molds (4, 4') placed at 90° and at least two lateral rotors (1, 1') capable of a reciprocating rotating translating motion, each supporting a half-mold (3, 3'), the three rotors (1, 1', 2) having their axis of rotation parallel to the feeder and discharge conveyor belts (6, 6', 7, 7', 8). Between each lateral rotor (1, 1') and the central rotor (2) an elevator/lifting device (5, 5') or other apparatus lifts/raises the pieces (19, 19') to be shaped from the feeder belt (7, 7') and brings them to the molding area, each lateral rotor (1, 1') capable of a rotating translating motion, translating in a radial direction towards the central rotor (2) molds the piece and then moves away with the molded piece (10, 10') and while rotating deposits it on the discharge conveyor belt (6, 6') of the molded pieces.

2 Claims, 4 Drawing Sheets

PROCESS OF AND APPARATUS FOR SHAPING PIECES OF SOFT, PASTY MATERIAL

FIELD OF THE INVENTION

The present invention concerns a molding apparatus for shaping pieces of soft and pasty substances, such as normal, extra grease and synthetic soaps, their mixtures and similar substances.

BACKGROUND OF THE INVENTION

Soap molding machines of the most common type presently on the market include an element called a disk or star or star-disk rotating on an axis set at right angle with respect to the direction of travel of the soap on feeder and discharge conveyor belts. This type of equipment, called "rotating disk machine", does not allow that a large number of molds be mounted because if the number of molds is increased, the disk diameter also increases and the resulting inertial forces cause severe mechanical and process problems. With such machines the production can be increased by increasing the speed while maintaining a constant number of molds and therefore they can be defined as "fast " type machines.

There is also another type of apparatus, less common, which includes an element, called a rotor, which rotates with a rotation axis parallel to the direction of travel of the soap on the feeder and discharge conveyor belts. Machines of this type, that could be called "rotor machines", allow a theoretically unlimited number of molds to be mounted along the major rotor axis; in practice, given the present state of the art, such machines are equipped with eight molds at the most mounted on one or two rotors. These machines can thus increase production by increasing the number of molds while operating at constant speed and they are therefore called "slow" type machines.

The machine speed in terms of strokes per minute is presently about 100-150 on the "fast " or disk type machines and 50-60 for the "slow" or "rotor" type machines, depending on the model.

Known molding machines, of the slow or rotor type, are subject to a series of disadvantages and problems. If 180° rotor rotation is envisaged, it will be difficult to keep the molded piece on the rotor, since the high centrifugal force developed by the high rotor speed pulls the soap off the mold. Those types of equipments where the pieces to be shaped are delivered by means of arms mounting suction cups or other cumbersome feeder units, require a long displacement of the translating half-molds to allow enough space for the insertion of said feeder units; to travel the additional distance, the half-molds will also have to travel very quickly. In addition, feeder units increase manufacturing and operating costs.

In those machines where for each piece to be mold two half-molds are foreseen facing each other, at 180° on the same rotor, there is a total of three half-molds for each piece to be molded: two for feeding and molding and one for discharging and cleaning. This increases operating costs of the molding machine.

The rotor carrying the half-molds must be cooled with an appropriate coolant. The use of a vacuum device to hold the soap in the rotational/translation phase is also normally required, as well as that of compressed air to expell it during the discharging phase. In those machines where the rotor always rotates in the same direction, fluid sealing problems will also arise.

From the Japanese publication No. JP-A-58 160 108 a molding machine for plastic material is known, in which the mold and countermold are capable of a rotating motion and a reciprocating linear motion.

OBJECT OF THE INVENTION

The aim of the present invention is to improve molding machines of the "rotor" type, in particular machines for molding soap pieces or the like, so that the above problems can be avoided.

BRIEF SUMMARY OF THE INVENTION

This object has been reached by providing an apparatus that includes at least three rotors having parallel axes, the two lateral rotors having a rotating/translating motion, so that when they reach the central rotor moving in a radial direction, they shape the product, then they move away with the molded piece and deposit it on the discharge conveyor belt by effecting a 90° rotation alternately with respect to each other, while the central rotor, equipped with two half-molds rotates by 90° and moves alternately one or the other half-mold in front of each one of the two lateral rotors while discharging excess molding product from the one of said half-molds which is not molding a piece of soap.

the apparatus, according to the instant invention, includes in its simplest form, a central rotor equipped with tow half-molds placed at 90° and capable of a reciprocating rotating motion and two lateral rotors, placed on the opposite sides of the central rotor, capable of a reciprocating rotating translating motion, each supporting a half-mold, the rotors having their axis of rotation parallel to the conveyor belts.

Preferably the apparatus comprises elevators/lifting devices mounted between the rotors which raise the bars to be molded up to the height of the mold.

Preferably in the apparatus according to the invention in the half-mold carrying the molded piece, the vacuum is created by means of flexible tubes so as to hold said piece.

The apparatus according to the invention can have any desired number of molds placed longitudinally along each rotor so that it can mold two, three, four etc. pieces at each translation of each lateral rotor.

The rotors can also be of greater number and have complex movements for solving particular feeding problems of the product.

An apparatus according to the invention, without any cumbersome feeding units, has the additional advantage of requiring only a short rotor translation motion during molding operation. The alternate rotor rotation at only 90° has as an advantage the fact that the molded piece is easily held on the rotor itself. For this same reason, coolants and compressed air, as well as the vacuum can be fed to the mold with simple flexible tubes in the mold. This is not possible with known rotor systems that rotate in the same direction and where rotating seals and complex constructive devices are necessary.

BRIEF DESCRIPTION OF THE DRAWINGS

The present invention will be now better described on the basis of examples of embodiments illustrated in the accompanying drawings, in which.

DETAILED DESCRIPTION OF THE INVENTION

Figures 1A, 1B, 1C, 1D, 1E, 1F:
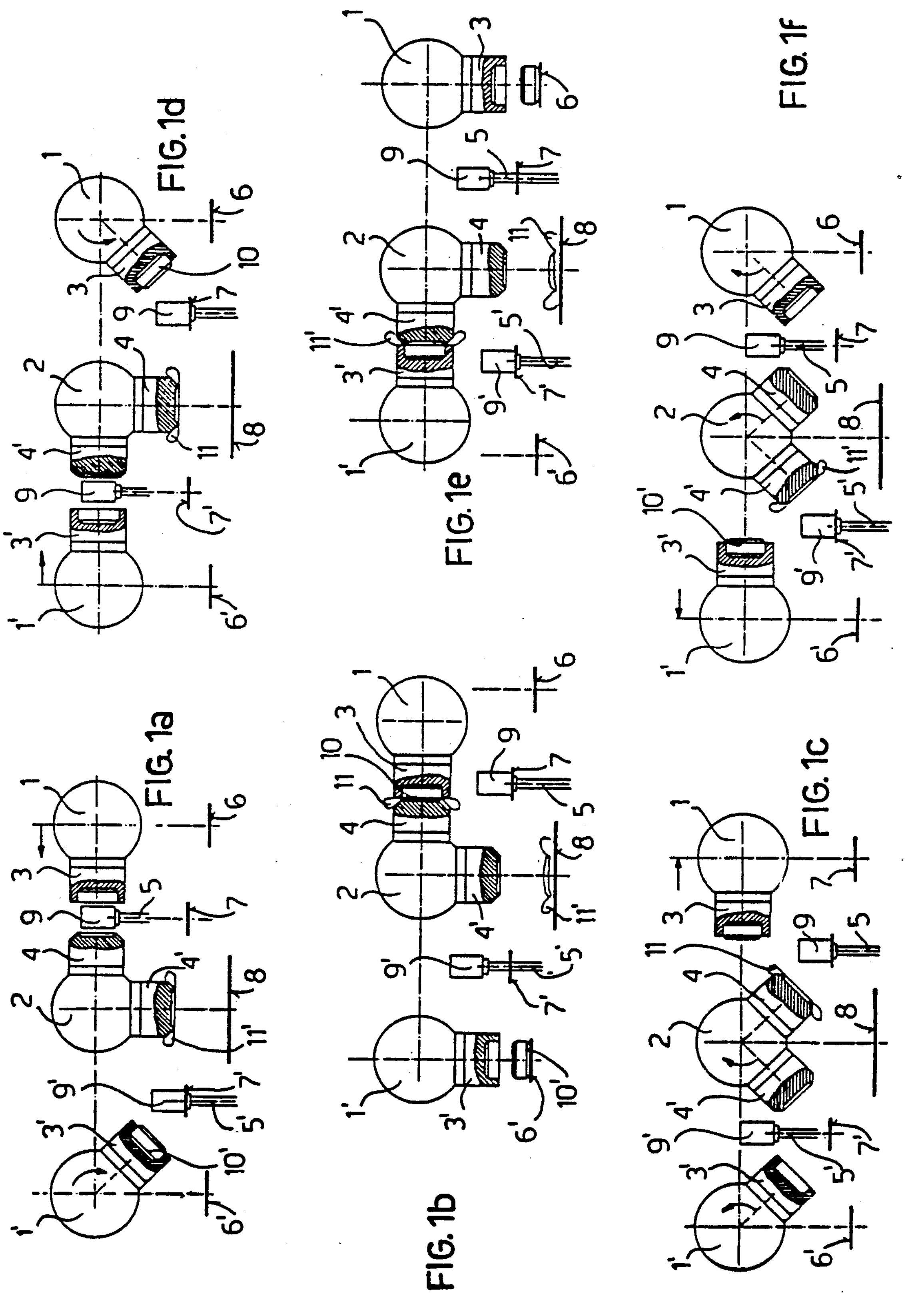
FIGS. 1*a*, 1*b*, 1*c*, 1*d*, 1*e*, and 1*f* schematically show a molding machine comprising three rotors in various subsequent working positions.

FIGS. 1*a*, 1*b*, 1*c*, 1*d*, 1*e* and 1*f* schematically show a soap molding apparatus during various production phases. This apparatus comprises a first rotor 1, capable of a reciprocating rotating/translating motion, having in a section of its periphery a half-mold 3. A second rotor 2 having two half-molds 4 and 4' on its periphery at 90° one from the other is placed near the rotor 1, at a certain distance therefrom. Near the rotor 2, but opposite to rotor 1, another rotor 1', similar to the first one, is placed, supporting a half-mold 3'. Under each rotor 1 and 1' a conveyor belt 6 and 6' respectively is placed and under rotor 2 another conveyor belt 8 is placed. In the open space between the rotors 1 and 2, 1' and 2' respectively, conveyors belts 7 and 7' respectively are visible as well as elevators 5 and 5' respectively, each supporting a bar of soap 9, 9'.

The operating cycle of this apparatus described hereunder, with reference to the only couple of rotors 1 and 2, taking into consideration that the molding occurs alternatively between rotor 1 and rotor 2 (FIGS. 1*a* and 1*b*) and between rotor 1' and 2 (FIGS. 1*d* and 1*e*). While a lateral rotor is molding the other rotor rotates so as to discharge the molded piece and vice versa.

The soap piece 9, already cut and ready to be molded is carrie don feeder belt 7 to the elevator/lifting device 5, which lifts it between the half-molds 3 and 4 (FIG. 1*a*). At this point, rotor 1 approaches rotor 2 and piece 9 is positioned in the half-molds 3 and 4, while lift 5 is lowered and ready to receive immediately a piece 9 for molding (FIG. 1*b*). While it is being molded, excess soap 11 exits from the mold. When the pressing action is terminated, rotor 1 moves away (FIG. 1*c*) and rotates (FIG. 1*d* and 1*e*) and deposits the molded piece 10 on the discharge conveyor belt 6 (FIG. 1*e*); rotor 2 rotates (FIG.1*c*) in opposite direction with respect to rotor 1 and deposits excess soap 11 on the discharge conveyor belt 8 (FIG. 1*e*). The molded piece 10 is held in half-mold 3 during the rotation/translation return motion of rotor 1 by a vacuum; during the releasing phase the vacuum is cut off and compressed air is blown into the mold to allow the release of the soap from the mold. Excess soap 11 can be held on the outside of half-mold 4 during rotation of rotor 2 by known anchoring means, not included in this invention. Rotors 1 and 2 rotate in the opposite direction to the previous one (FIG. 1*f*) and reach the position shown in FIG. 1*a* so as to be able to receive a new piece 9 to be molded.

The half-molds 3, 3', 4 and 4' are cooled by means of flexible tubes (not shown), which in addition to the coolant, also delivers to molds 3 and 3' the air necessary for releasing the pieces and the vacuum to keep them in the mold. As the rotors move with reciprocating motion the air and coulant feeding can be carried out by means of tubes without rotation connectors.

Figure 2:
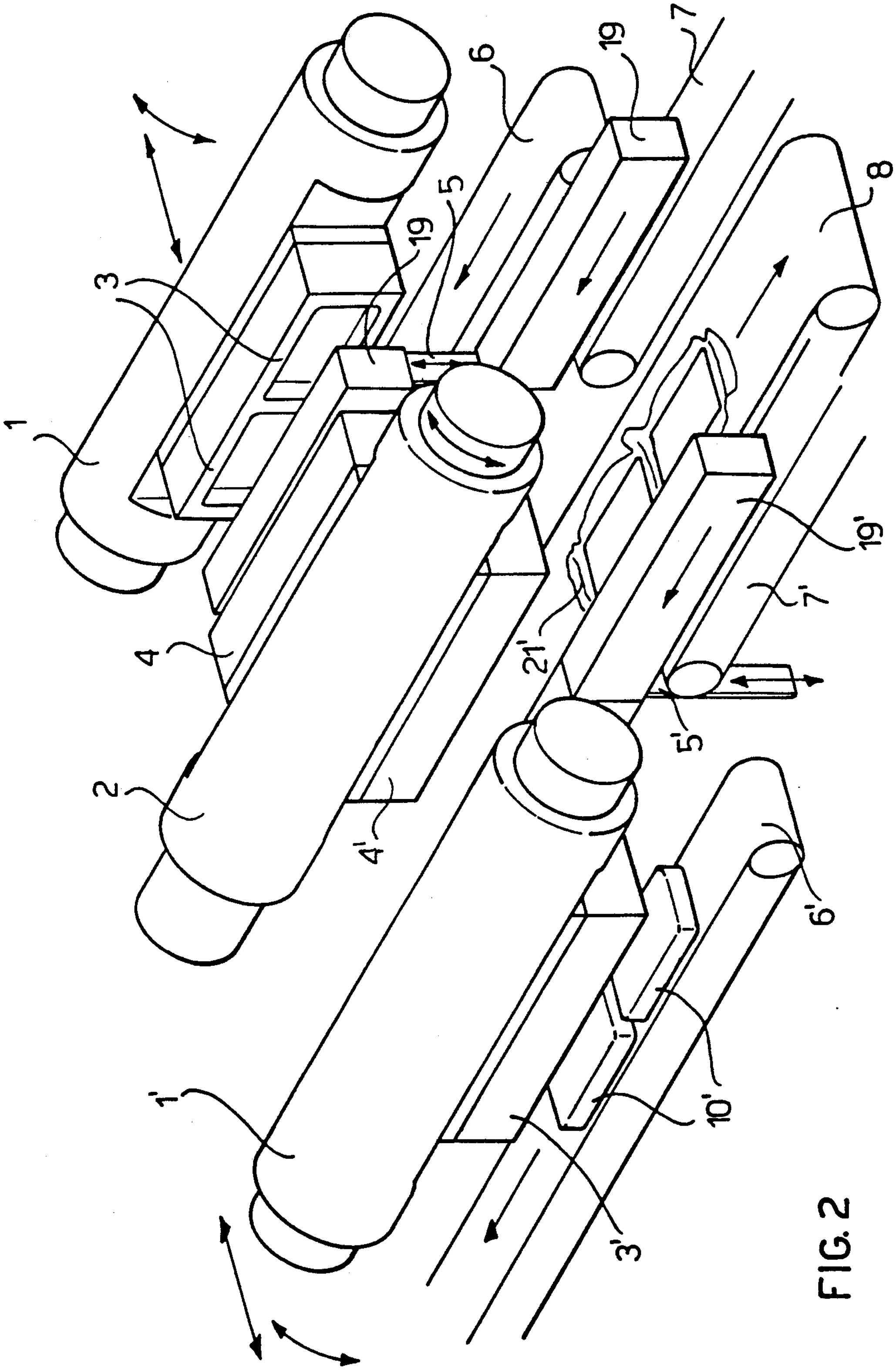
FIG. 2 show an axonometric view of a first embodiment of the invention.

FIG. 2 shows an apparatus, having an operating system as shown in FIGS. 1*a* to 1*f*, which is foreseen for molding two pieces of soap at each translating motion of each lateral rotor, as soap bars 19 and 19' are pre-cut to such a length as to allow two pieces of soap to be molded. Each of them produces two pieces of soap 10 and two pieces 10' as well as excess soap 21 and 21' respectively, which is the double with respect to the excess soap 11 and 11'.

Figure 3:
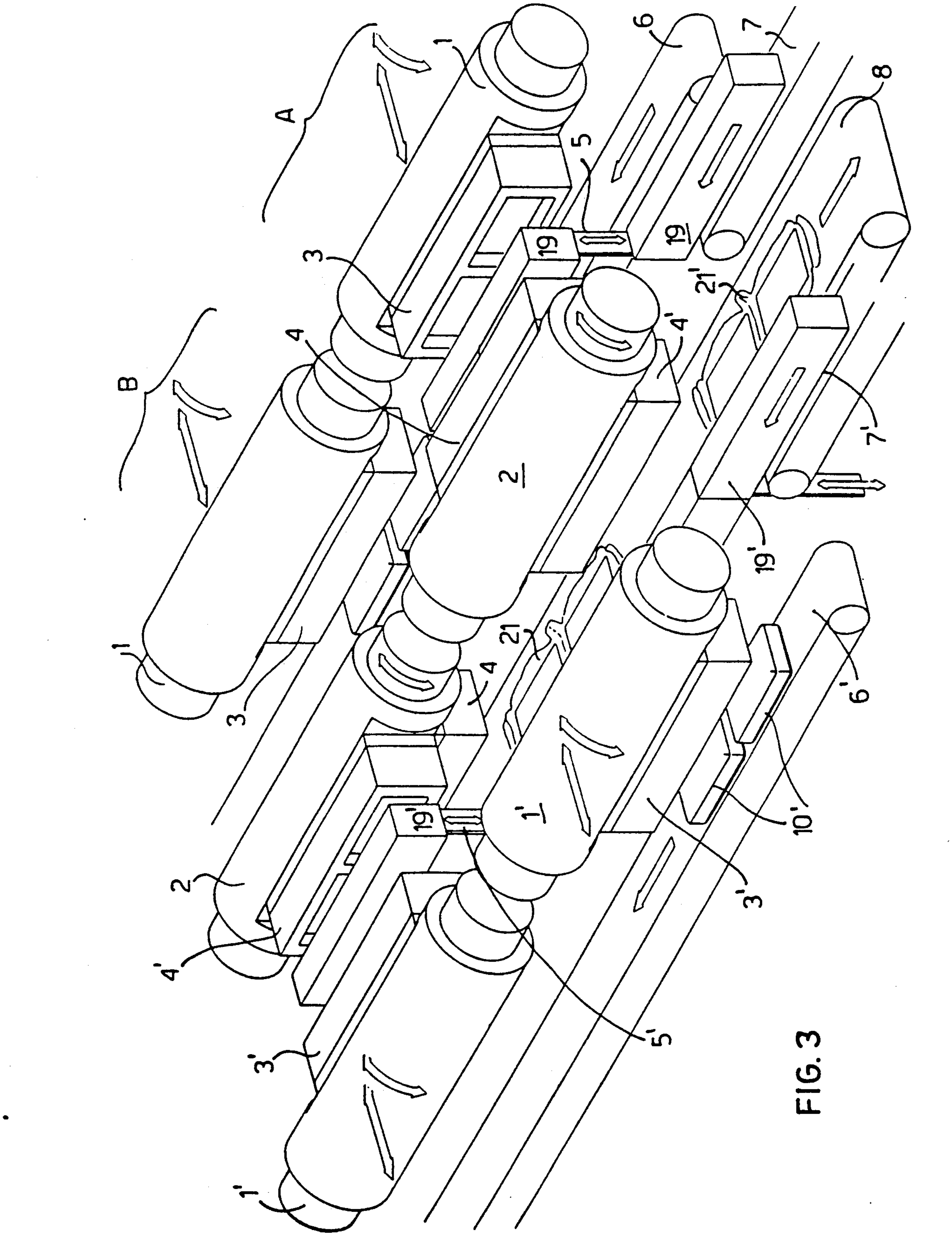
FIG. 3 shows an axonometric view of a second embodiment.

FIG. 3 shows an apparatus made up of two units A and B of three rotors disposed one right after the other so that each rotor of one unit is coaxial with the corresponding rotor of the other unit. Each unit operates, fi taken singly, like the apparatus shown in FIG. 2. The two units are synchronized with each other in such a way that when the first unit A is molding with the lateral rotor 1, placed on the right in the illustration, the second unit B is molding with the lateral rotor 1' placed on the left in the illustration and vice versa. There are two feeder belts, 7 and 7', common both to the first unit A of three rotors and the second unit B. In a similar way discharge belts 6 and 6' of molded pieces and belt 8 for excess soap 21 and 21' are common to both units A and B.

Figure 4:
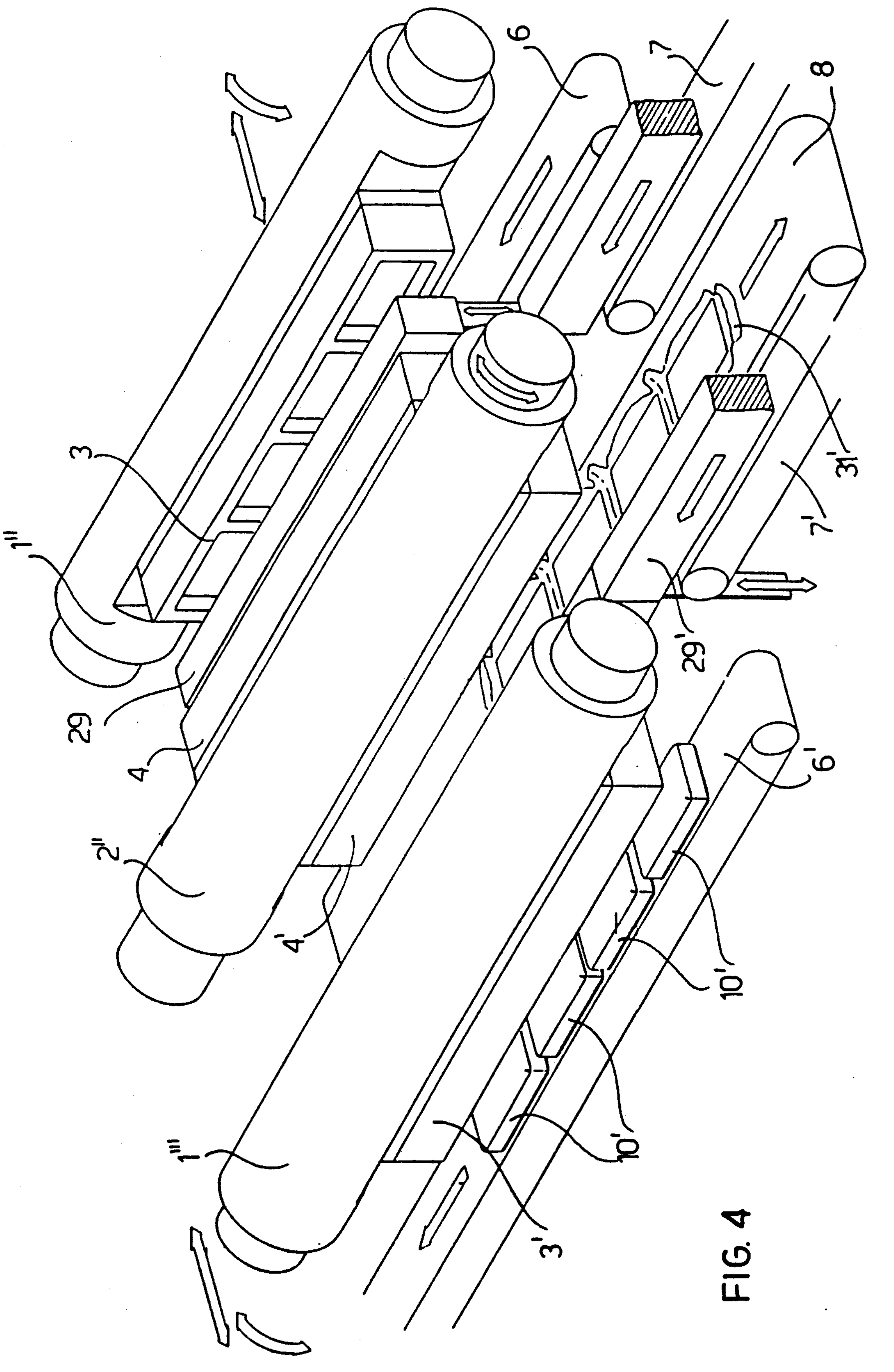
FIG. 4 shows an axonometric view of a third embodiment.

FIG. 4 shows an apparatus operating as shown in FIGS. 1*a* to 1*f*.

This apparatus is foreseen for molding four pieces of soap at each translation of rotors 1'', 1'' and 2''. To this purpose blank soap bars 29 and 29' are fed on belts 7 and 7'; said bars 29 and 29' are of such a length to be used to form four pieces 10 and four pieces 10', that are removed by means of belts 6 and 6' respectively. Excess soap 31 and 31' is removed by belt 8.

In the attached figures, arrows indicate the direction of travel of each element.

I claim:

1. A process of shaping pieces of a soft, pasty material comprising the steps of:
   a) positioning a piece of material between a central rotor and a lateral rotor, each of said rotors having corresponding and aligned half-molds;
   b) moving said lateral rotor in a radial direction towards said central rotor to shape said piece;
   c) moving said lateral rotor containing said shaped piece in a radial direction away from said central rotor;
   d) rotating said lateral rotor containing said shaped piece;
   e) depositing said shaped piece onto a discharge unit;
   f) rotating said central rotor in a direction opposite the rotation of said lateral rotor to align another half-mold of said central rotor with a half-mold of another lateral rotor;
   g) depositing excess material from said half-mold of said central rotor onto a discharge unit;
   h) positioning another piece between said another half-mold of said central rotor and said half-mold of said another lateral rotor wherein said another half-mold and said half-mold are aligned;
   i) moving said another lateral rotor in a radial direction towards said central rotor to shape said another piece;
   j) moving said another lateral rotor containing said another shaped piece in a radial direction away from said central rotor;
   k) rotating said another lateral rotor containing said another shaped piece;
   l) depositing said another shaped piece onto a discharge unit;
   m) rotating said central rotor in a direction opposite the rotation of said another lateral rotor to align a half-mold of said central rotor with a half-mold of said lateral rotor in order to repeat the process; and n) depositing excess material from said another half-mold of said central rotor onto a discharge unit.

2. An apparatus for shaping pieces of a soft, pasty material comprising:

a) three rotors having parallel axes, a central rotor and two lateral rotors, said central rotor having two half-molds placed 90° apart and capable of rotating motion and said lateral rotors capable of rotating motion and capable of translating motion in a radial direction towards and away from said central rotor;

b) feeder units for feeding pieces of material; and c) discharge units for removing and transporting shaped pieces of material and excess material.

* * * * *